Oct. 24, 1939. C. E. REED 2,177,332
ROLLER CUTTER ORGANIZATION FOR EARTH BORING DRILLS
Original Filed Oct. 1, 1937 2 Sheets-Sheet 1

Inventor.
Clarence E. Reed,
By Spear, Donaldson & Hull
Attorneys

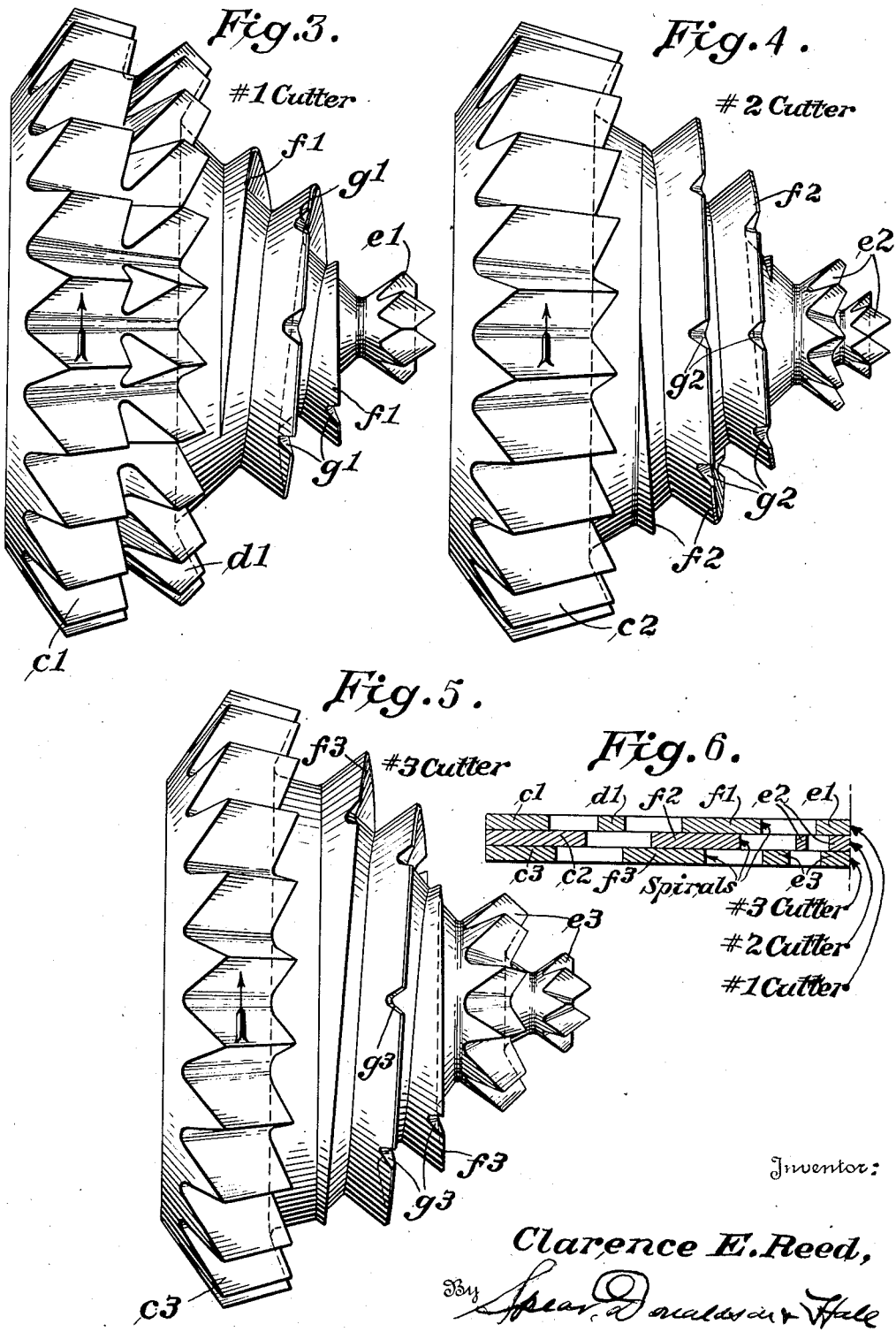

Patented Oct. 24, 1939

2,177,332

UNITED STATES PATENT OFFICE 2,177,332

ROLLER CUTTER ORGANIZATION FOR EARTH BORING DRILLS

Clarence E. Reed, Wichita, Kans., assignor to Chicago Pneumatic Tool Company, New York, N. Y., a corporation of New Jersey Original application October 1, 1937, Serial No. 166,872. Divided and this application February 5, 1938, Serial No. 189,020

14 Claims. (Cl. 255—71)

The invention concerns roller cutter, or cutters, for earth boring drills, the present case being a division of that filed by me October 1, 1937, Serial No. 166,872.

In the drawings

Figs. 3, 4, and 5 are views of a set of rotary cutters adapted to be mounted at the lower end of the drill bit in the order designated #1, #2, and #3 in the direction of rotation of the drill head.

Fig. 6 is a diagram showing the relative areas cut by the roller cutters.

As the spindle structure and roller bearing organization form no part per se of this division of the subject matter of the application above referred to, it is not necessary to embody herein a detail description of these parts, but reference is made in this connection to the said prior application.

Figure 1:
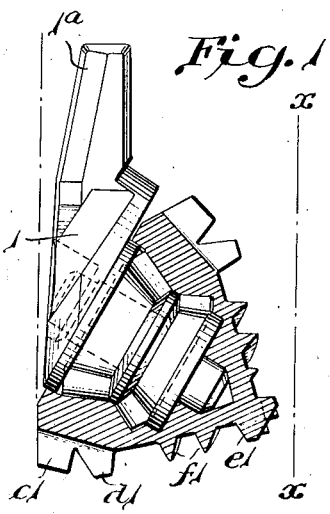
Figure 1 is a vertical sectional view of one of the frusto-conical roller cutters and its supporting means, the parts being shown as they are disposed in the position they assume when mounted in the drill head.

It is thought sufficient to point out in this connection that $I$ indicates generally the main spindle section, and $Ia$ the shank thereof, which latter is adapted to be seated in any suitable way in connection with a standard type drill head, not shown, so that the spindle will be supported in a position inclined downwardly and inwardly toward the vertical axis of the drill, indicated by the dotted line $x$—$x$ in Fig. 1.

In the present form of cutter organization, there are three roller cutter and spindle units, such as shown in Fig. 1, disposed at 120° apart around the vertical axis of the drill head, though the invention is not limited in this respect, because two such units may be employed at the bottom of the drill spaced apart 180°.

The drill head carrying these units rotates clockwise about the vertical axis of the drill; that is to say, when looking down upon the drill, while in the hole being bored, the revolution of the drill would be clockwise.

Figure 2:
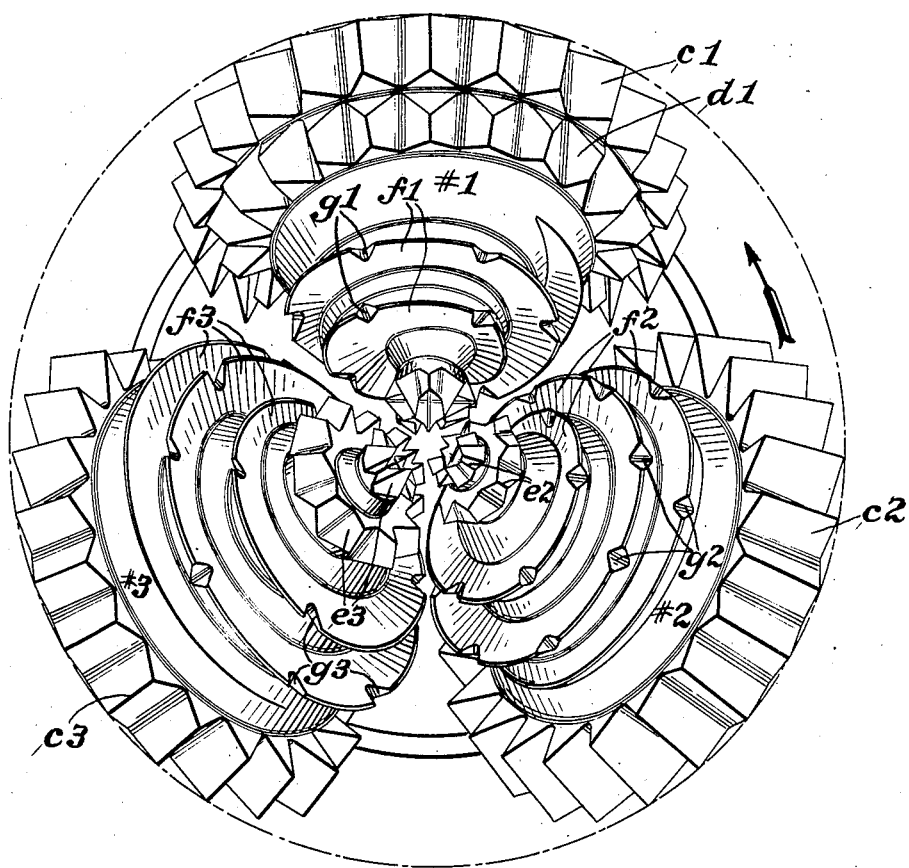
Fig. 2 is a bottom plan view of the drill bit showing mainly three roller cutters.

The rotary cutters are arranged in the order #1, #2, #3, Fig. 2, around the vertical axis of the drill in the direction of rotation indicated by the arrow. The cutters are made up with teeth at their base zones and at their apex zones with spiral cutting ribs at the zone intermediate the toothed zones. These teeth and spirals of the group of cutters are designed collectively to act upon substantially the entire surface of the formation at the bottom of the bore hole.

Referring to cutter #1, this has a base cutting zone made up of two circular rows of teeth $c^1$, $d^1$, adjacent each other, those of the row $c^1$ having comparatively long cutting edges in planes radial to the axis of the cutter and at an inclination to the cutter axis, and those of the row $d^1$ having shorter edges than those marked $c^1$ and being inclined at a steeper angle to the axis of the cutter. At the apex of this cutter #1 there is a row of teeth $e^1$ and between the zones where these lie and the zone in which the teeth $d^1$ are located, there is spiral cutting means consisting of a comparatively sharp edged rib $f^1$, said rib being of substantially inverted V-shape in cross section. The spiral turns when viewed from the apex end of the cutter run anti-clockwise from the apex end of the cutter towards the base end thereof. The cutting edge of this spiral rib is notched at comparatively wide intervals, said notches being marked $g^1$. This cutter scores, or cuts, the formation and crowds, or scrapes, it radially outward relative to the center of the bore hole.

Fig. 4 is a side view of #2 rotary cutter. This rotates in the direction of the arrow about its own axis, the same as cutter #1. It has a single row of base teeth $c^2$ with long cutting edges to substantially track the wider base teeth $c^1$ of the cutter #1 and tracking also substantially, though not fully, the space between the rows of teeth $c^1$, $d^1$ of cutter #1. It has two circumferential rows of spaced apart teeth $e^2$ at its apex; a spiral cutter rib $f^2$ whose turns run in the opposite direction from the turns of the spiral cutter rib $f^1$ of cutter #1. This spiral rib, or cutter, $f^2$ has notches $g^2$.

Fig. 5 shows a side elevation of cutter unit #3. It has a circumferential row of base cutting teeth $c^3$; two circumferential rows of apex cutting teeth $e^3$ spaced apart from each other, and a cutter rib $f^3$ running around the cutter unit spirally in the same direction as the spiral cutter rib $f^1$ of cutter #1, but in a reverse direction from the spiral cutter rib $f^2$ of cutter #2.

As shown in the diagram which illustrates the relation between the teeth of the several cutters, the tooth arrangement is such that the teeth, or cutting edges of each cutter, are disposed that taking all the teeth of all the cutters collectively, substantially the entire area at the bottom of the hole being bored will be traversed by one or another of the cutting edges, which, it will be noticed, do not track each other exactly, but whose tracks largely overlap. The notches of the spiral cutting ribs serve more effectively to break up or cut the formation than were the cutting edge of the rib continuous instead of being notched at intervals. It will be noted that the toothed base cutting zones of the several cutters are at an angle to the apex cutting zone thereof.

It will be seen that by having the spiral cutter means terminate at a distance from the row of individual cutter teeth at the base and apex of the cutter, ample outlet space is provided for the flowing away of the flushing fluid and the detritus carried along thereby. Contributing to this wide outlet is the shape of the termini of the spiral cutter which diminish in height and width to the point where they substantially merge into the surface of the body of the cone, spaced apart a substantial distance from the rows of individual teeth.

It will be apparent to those skilled in the art that the invention herein disclosed relates to a scraping cutting action rather than to a crushing action, and the weight imposed upon the spiral cutting element forces the crest or edge to penetrate earth formation and the rotation of the drill on its axis causes the spiral crests and sloping side of the spiral element to push or move the earth laterally. Terminating the spiral as shown and described provides ample and large space between the spiral and the concentric rows for exit of the detritus from beneath the drill bit so the cutting edges do not have to roll over loosened materials, but always contact the virgin material and rapidly, progressively and continuously progress. Very rapid drilling speed has resulted and a much more smooth and steady drilling motion of the drill stem, reducing destructive vibrations.

I claim:

1. A rotary cutter, for earth boring drills, of general frusto-conical form having a circumferential row, or rows, of cutting teeth at its base, a circumferential row, or rows, of cutting teeth at its apex, said row or rows being in a plane lying at right angles to the axis of the cutter and having the edges forming their crests lying in axial planes of the cutter and a spiral rib-like cutter at the zone between the base cutting teeth and the apex cutting teeth, the said teeth crests alternating with troughs between them extending lengthwise of the cutter.

2. A rotary cutter organization for earth boring drills having a group of rotary cutting units according to claim 1 revoluble about the vertical axis of the drill, and spaced apart about said drill, the cutting teeth and spiral cutter rib of one cutter unit non-tracking the teeth and spiral rib of another cutter unit to cut substantially the entire area at the bottom of the hole, the spiral rib of one cutter running leftward and the spiral rib of another unit running righthand about their respective axes, substantially as described.

3. A roller cutter for earth boring drills, of frusto-conical form having a single circumferential row of teeth at its base, two rows of circumferential teeth at its apex portion, and a spiral cutter at the zone between the teeth at the base and the teeth at the apex, said circumferential rows of teeth having their crests extending in axial planes of the cutter, substantially as described.

4. An earth boring drill comprising a plurality of rotatable cutters, one of said cutters having a concentric row of teeth adapted to roll over an area near the side wall of the hole, another concentric row of teeth adapted to roll over an area near the center of the hole, said teeth having crests lying substantially in axial planes of the cutter, a spiral element on said cutter between said concentric rows of teeth, said spiral element terminating at each end thereof at a point widely spaced apart from the row of individual cutting teeth at the adjacent end of the cutter, and another roller cutter having a spiral element adapted to cut on the bottom of the hole between the paths of said concentric rows.

5. A frusto conical roller cutter for an earth boring drill having at least one circumferential row of cutting teeth at each end thereof, each row lying in a plane which is at a right angle to the axis of the cutter, each of said circumferential rows of teeth having crests extending in axial planes of the cutter, said crests being separated by and alternating with troughs, and other cutting teeth or elements in spiral formation lying in a zone between the circumferential rows of cutting teeth, said other cutting teeth or elements around the periphery of the cutter approximately in planes at an inclination to the plane first mentioned, and the ends of said spiral formation respectively spaced from the side of the adjacent circumferential row.

6. A rotary roller cutter for an earth boring drill having cutting teeth thereon arranged in a concentric row at each end of the cutter surface, the teeth of said concentric rows having crests in axial planes of the cutter, the axial plane of the crest of one tooth being through the trough separating two teeth in the concentric row at the other end of said cutter, and intermediate said rows having other cutting teeth arranged in a spiral and positioned for contacting only part of the area between said rows.

7. A roller bit comprising a plurality of cutters according to claim 6, and the said spiral cutting teeth arranged in non-tracking relationship with each other.

8. A roller cutter having a toothed base cutting zone inclined to a frusto-conical cutting zone, a concentric row of teeth at the apex portion of said frusto-conical zone having cutting edges uniformly spaced and said edges lying in axial planes of the cutter, and other teeth on said frusto-conical zone positioned in a spiral, said spiral approximating two turns, more or less, around said zone, and terminating with its ends at points widely spaced apart respectively from the said toothed base cutting zone, and from the concentric row of teeth.

9. A roller cutter according to claim 8, wherein said other teeth are formed by notches therebetween, and a trough between the spiral teeth.

10. An earth boring drill comprising a cutter having individual cutting teeth positioned thereon in a row at one end of the cutter, the said teeth having crests with troughs between them and with said crests uniformly spaced in said row and lying in axial planes of said cutter, another row of individual teeth at the other end of said cutter having crests uniformly spaced, lying in axial planes of the cutter and with troughs between said crests, and other teeth positioned between the said rows in a spiral, the turns of which are widely spaced, said spiral terminating at each end thereof at a point widely spaced apart from the row of individual cutting teeth at the adjacent end of the cutter, substantially as described.

11. An earth boring drill according to claim 10 in which the end portions of the spiral are of gradually diminishing height to the points where they substantially merge with the surface of the body of the cutter.

12. An earth boring drill according to claim 10 in which the end portions of the spiral cutter are tapered in height and width, substantially as described.

13. An earth boring drill according to claim 10 wherein the spiral is approximately of two turns, the terminal portion of which decreases sharply in height and substantially vanishes at the surface of the body of the cutter, substantially as described.

14. A frusto-conical roller cutter for an earth boring drill having a circumferential row of teeth at its apex in a plane at right angles to its axis and a row of circumferential teeth at its base portion in a plane at right angles to the axis, the crests of said teeth being in axial planes of the cutter and other cutting teeth in the zone between the said circumferential rows of teeth, said other teeth being located in series substantially spirally about said zone, the termini of said series being spaced apart from the circumferential rows of teeth.

CLARENCE E. REED.